US007942975B2

(12) United States Patent
Moriya et al.

(10) Patent No.: US 7,942,975 B2
(45) Date of Patent: May 17, 2011

(54) CERAMIC SPRAYED MEMBER-CLEANING METHOD

(75) Inventors: Tsuyoshi Moriya, Nirasaki (JP); Kouji Mitsuhashi, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 12/358,915

(22) Filed: Jan. 23, 2009

(65) Prior Publication Data

US 2009/0133717 A1 May 28, 2009

Related U.S. Application Data

(62) Division of application No. 11/268,625, filed on Nov. 8, 2005, now abandoned.

(60) Provisional application No. 60/635,970, filed on Dec. 15, 2004.

(30) Foreign Application Priority Data

Nov. 8, 2004 (JP) ................................ 2004-323546

(51) Int. Cl.
*C03C 23/00* (2006.01)

(52) U.S. Cl. ................................................ 134/2; 134/3

(58) Field of Classification Search ........................ None
See application file for complete search history.

(56) References Cited

U.S. PATENT DOCUMENTS

| | | | | |
|---|---|---|---|---|
| 3,498,802 | A * | 3/1970 | Stookey et al. | 501/54 |
| 5,718,046 | A | 2/1998 | Wang | |
| 2002/0000239 | A1 * | 1/2002 | Sachdev et al. | 134/2 |
| 2002/0107133 | A1 * | 8/2002 | Troczynski et al. | 501/1 |
| 2003/0026917 | A1 * | 2/2003 | Lin et al. | 427/453 |
| 2003/0113254 | A1 * | 6/2003 | Belov et al. | 423/608 |
| 2004/0216667 | A1 | 11/2004 | Mitsuhashi et al. | |
| 2005/0103275 | A1 | 5/2005 | Sasaki et al. | |
| 2006/0099457 | A1 * | 5/2006 | Moriya et al. | 428/701 |
| 2009/0104781 | A1 | 4/2009 | Sasaki et al. | |

FOREIGN PATENT DOCUMENTS

| | | |
|---|---|---|
| JP | 63-120496 | 5/1988 |
| JP | 04045261 | 2/1992 |
| JP | 7-78775 | 3/1995 |
| JP | 8-39019 | 2/1996 |
| JP | 8-181117 | 7/1996 |
| JP | 11-54484 | 2/1999 |
| JP | 11-54487 | 2/1999 |
| JP | 2000-294508 | 10/2000 |
| JP | 2002-124503 | 4/2002 |
| JP | 2003-126795 | 5/2003 |
| JP | 2004-260159 | 9/2004 |

* cited by examiner

*Primary Examiner* — Michael Kornakov
*Assistant Examiner* — Eric Golightly
(74) *Attorney, Agent, or Firm* — Oblon, Spivak, McClelland, Maier & Neustadt, L.L.P.

(57) ABSTRACT

A ceramic sprayed member-cleaning method which is capable of reliably suppressing desorption and attachment of water. The surface of a ceramic sprayed member and water are chemically bonded to each other, whereby the water is stabilized. Water physically adsorbed on the surface of the ceramic sprayed member is desorbed.

7 Claims, 5 Drawing Sheets

CERAMIC SPRAYED MEMBER-CLEANING METHOD

CROSS-REFERENCE TO RELATED APPLICATIONS

The present application is a divisional application of and claims priority to U.S. application Ser. No. 11/268,625, filed on Nov. 8, 2005, of which the entire content is hereby incorporated by reference, with the present application also claiming priority to predecessors of the '625 application as follows. U.S. application Ser. No. 11/268,625 is based upon and claims the benefit of priority from U.S. Provisional Application No. 60/635,970, filed Dec. 15, 2004 and prior Japanese Application JP 2004-323546, filed on Nov. 8, 2004.

BACKGROUND OF THE INVENTION

1. Field of the Invention

The present invention relates to a ceramic sprayed member-cleaning method, a program for implementing the method, a storage medium storing the program, and a ceramic sprayed member, and more particularly to a ceramic sprayed member-cleaning method for cleaning ceramic sprayed members, such as an electrode, a focus ring, and an electrostatic chuck, which are used in a chamber in which a plasma atmosphere is formed by a processing gas, and a conveying arm used in a conveyor for conveying substrates and the like to a processing apparatus, a program for implementing the method, a storage medium storing the program, and a ceramic sprayed member.

2. Description of the Related Art

Conventionally, a plasma processing apparatus that carries out predetermined plasma processing on a substrate such as a semiconductor wafer generally includes a chamber for housing the substrate. In such processing apparatus, members with ceramics such as yttrium oxide ($Y_2O_3$) (i.e. yttria), or aluminum oxide ($Al_2O_3$) thermally sprayed thereon are used as an inner wall of the chamber, an upper electrode and the like. In general, ceramics tend to have high reactivity with water in the air, and therefore, when the chamber is opened to the atmosphere for a periodic inspection or when the chamber is subjected to wet cleaning, a large amount of water can be attached to the inner wall of the chamber, an upper electrode, and the like, which are formed of the ceramic-sprayed members.

Desorption and attachment of water from and to the inner wall of the chamber can cause problems, such as an increase in chamber-evacuating time, which results in lowering of the operation rate of the processing apparatus, abnormal film formation in forming a metal film, instability of the etching rate in etching an oxide film or the like, separation of particles, and abnormal discharge in generating plasma.

To solve such problems, there has been proposed a vacuum chamber as the above-mentioned chamber that is provided with a heater for heating a non-reactive gas, such as argon, to a temperature not lower than a predetermined temperature before the non-reactive gas is introduced into the vacuum chamber, and a chamber heater capable of applying additional heat to the vacuum chamber, whereby impurities or contaminants are scavenged therefrom (see Japanese Laid-Open Patent Publication (Kokai) No. H07-78775).

In this vacuum chamber, after the non-reactive gas heated by the heater is passed through the vacuum chamber over a predetermined time period during a processing operation, the flow of the heated non-reactive gas to the vacuum chamber is stopped, and pressure within the vacuum chamber is checked.

Further, the vacuum chamber is evacuated to approximately $6.7\times10^{-5}$ Pa ($5.0\times10^{-7}$ Torr) while the vacuum chamber is still hot, and if the pressure of the non-reactive gas within the evacuated vacuum chamber is higher than that in the vacuum chamber obtained by a previously carried out test, it is estimated that there is a leak from the vacuum chamber, whereby measures can be taken to solve the problems.

Further, there has been proposed an ECR (Electron Cyclotron Resonance) plasma etching apparatus comprised of a chamber, a microwave-introducing port formed in one end of the chamber, for introducing a microwave into the chamber, an exciting coil disposed in a manner enclosing the microwave-introducing port or a part of the chamber, a gas-introducing system for introducing a predetermined amount of gas into the chamber, and an evacuating system for evacuating the chamber to a high vacuum (see Japanese Laid-Open Patent Publication (Kokai) No. H08-181117).

In this ECR plasma etching apparatus, the chamber is evacuated by the evacuating system at a low rate, Ar gas is introduced into the chamber through the gas-introducing system, and a microwave is supplied via the microwave-introducing port. Further, the exciting coil is energized to thereby generate plasma in the chamber. Contact between the generated plasma and the inner wall surface of the chamber raises the temperature of the inner wall surface of the chamber, whereby water molecules attached to the inner wall surface are vaporized.

Further, there has been proposed an ultrahigh vacuum apparatus comprised of a growth chamber as an airtight container which is evacuated to an ultrahigh vacuum, a substrate manipulator as a member accommodated in the growth chamber, a substrate holder provided at a lower end of the substrate manipulator, and a heater section as internal heating means disposed at opposite sides of the substrate manipulator with respect to the horizontal direction (see Japanese Laid-Open Patent Publication (Kokai) No. 2000-294508).

In this ultrahigh vacuum apparatus, the growth chamber is externally heated while operating a vacuum pump to evacuate the growth chamber to an ultrahigh vacuum, and further the substrate manipulator and the substrate holder are heated by the heater section within the growth chamber while evacuating the growth chamber so as to maintain the ultrahigh vacuum in the growth chamber. Thus, degassing of the growth chamber is carried out.

Further, there has been proposed a plasma processing apparatus comprised of a base member formed therein with an opening, an electrode mounted at the opening from below via an insulating member, a box-shaped lid disposed above the electrode, a vacuum chamber formed as a space enclosed by the lid, the base member, and the electrodes, a heater mounted on an upper surface of the lid, for heating the inner wall of the vacuum chamber, and a control section for controlling the heater (see Japanese Laid-Open Patent Publication (Kokai) No. H11-54484).

In this plasma processing apparatus, when plasma processing is carried out, the heater is controlled by the control section so that the temperature of the inner wall of the vacuum chamber is held within a preset temperature range. This makes it possible not only to reduce the amounts of water and organic substances adsorbed on the inner wall of the vacuum chamber, but also to quickly evaporate off the water and the organic substances. Moreover, time required for vacuum suction can be considerably shortened.

Furthermore, there has been proposed a plasma cleaning apparatus comprised of a vacuum chamber defined by a base plate and a lid, an electrode mounted through the base plate, a replaceable shield member mounted on a ceiling surface within the vacuum chamber, and a control section connected to a vacuum gauge, and having a storage section for storing a set vacuum degree and a set chamber-evacuating time period which are set to the vacuum chamber, and a clock (see Japanese Laid-Open Patent Publication (Kokai) No. H11-54487).

In this plasma cleaning apparatus, the current time t1 is read in from the clock so as to measure the chamber-evacuating time period. Then, vacuum measurement data is delivered from the vacuum gauge, and a time t2 when the degree of vacuum reaches the set vacuum degree is read in. Further, if the chamber-evacuating time period T determined from the time t1 and the time t2 is within the set time period T0, a gas supply device is driven to introduce a gas for plasma generation into the vacuum chamber. Next, a high-frequency power supply is driven to apply a high-frequency voltage to the electrode, whereby plasma is generated for plasma cleaning, and plasma cleaning is thus carried out. As a result, an increase in the evacuation time period can be suppressed to a predetermined limit so as to maintain tact time.

Another apparatus similar to the above described plasma cleaning apparatus has also been proposed (see Japanese Laid-Open Patent Publication (Kokai) No. 2002-124503).

However, in any of the proposed apparatuses, in the case where a member having ceramic thermally sprayed on a surface thereof is used in the chamber, the effect of removing water is limited, so that it is impossible to reliably suppress desorption and attachment of water from and to the ceramic sprayed member.

SUMMARY OF THE INVENTION

It is an object of the present invention to provide a ceramic sprayed member-cleaning method, and a program for implementing the method, which are capable of reliably suppressing desorption and attachment of water, a storage medium storing the program, and a ceramic sprayed member.

To attain the above object, in a first aspect of the present invention, there is provided a method of cleaning a ceramic sprayed member having a predetermined ceramic material thermally sprayed on a surface thereof, comprising a stabilizing step of chemically bonding the surface of the ceramic sprayed member and water to each other to stabilize the water, and a desorbing step of desorbing water physically adsorbed on the surface of the ceramic sprayed member.

Preferably, the stabilizing step comprises carrying out hydration processing in which the ceramic sprayed member is exposed to a high-pressure, high-humidity, and high-temperature environment.

Preferably, the stabilizing step comprises forming a layer mainly composed of a hydroxide of ceramic on the surface of the ceramic sprayed member.

Preferably, the desorbing step comprises heating the ceramic sprayed member.

Preferably, the method further comprises a removing step of removing deposits attached to the ceramic sprayed member, before execution of the stabilizing step.

More preferably, the removing step comprises at least soaking of the ceramic sprayed member in an organic solvent or acid.

Preferably, the ceramic material comprises a rare earth metal oxide.

More preferably, the rare earth metal oxide comprises yttria.

Preferably, the ceramic sprayed member is used in a processing chamber for processing substrates.

To attain the above object, in a second aspect of the present invention, there is provided a ceramic sprayed member comprising a base material, a surface layer formed by thermally spraying a predetermined ceramic material onto a surface of the base material, the surface layer containing a compound having a hydroxyl group, wherein water physically adsorbed on a surface of the surface layer has been desorbed.

To attain the above object, in a third aspect of the present invention, there is provided a ceramic sprayed member comprising a base material, a surface layer formed by thermally spraying a predetermined ceramic material onto a surface of the base material, the surface layer containing a compound having a hydroxyl group, wherein an amount of water released from the surface layer by evacuation carried out for a predetermined time period at room temperature is not larger than $1.0\times10^{16}/cm^2$.

To attain the above object, in a fourth aspect of the present invention, there is provided a ceramic sprayed member comprising a base material, a surface layer formed by thermally spraying a predetermined ceramic material onto a surface of the base material, the surface layer containing a compound having a hydroxyl group, wherein no O—H bond in a $H_2O$ structure is detected from the surface layer.

Preferably, the compound having a hydroxyl group is a hydroxide of the predetermined ceramic material.

Preferably, the ceramic comprises a rare earth metal oxide.

More preferably, the rare earth metal oxide comprises yttria.

Preferably, the ceramic sprayed member is used in a processing chamber for processing substrates.

To attain the above object, in a fifth aspect of the present invention, there is provided a computer-readable program for causing a computer to execute a method of cleaning a ceramic sprayed member having a predetermined ceramic material thermally sprayed on a surface thereof, comprising a stabilizing module for chemically bonding the surface of the ceramic sprayed member and water to each other to stabilize the water; and a desorbing module for desorbing water physically adsorbed on the surface of the ceramic sprayed member.

Preferably, the stabilizing module carries out hydration processing in which the ceramic sprayed member is exposed to a high-pressure, high-humidity, and high-temperature environment.

Preferably, the stabilizing module forms a layer mainly composed of a hydroxide of ceramic on the surface of the ceramic sprayed member.

Preferably, the desorbing module heats the ceramic sprayed member.

Preferably, the program further comprises a removing module for removing deposits attached to the ceramic sprayed member, the stabilizing module forms the layer mainly composed of a hydroxide of ceramic on the surface of the ceramic sprayed member.

More preferably, the removing module carries out at least soaking of the ceramic sprayed member in an organic solvent or acid.

To attain the above object, in a sixth aspect of the present invention, there is provided a storage medium storing the computer-readable program.

According to the present invention, the surface of the ceramic sprayed member and water are chemically bonded to each other for stabilization of the water, and water physically adsorbed on the surface of the ceramic sprayed member is desorbed. Thus, when the ceramic sprayed member is used, it is possible to reliably suppress desorption and attachment of water from and to the ceramic sprayed member.

Further, since the hydration processing is carried out by exposing the ceramic sprayed member to a high-pressure, high-humidity, and high-temperature environment, it is possible to further stabilize water chemically bonded to the surface of the ceramic sprayed member, thereby more reliably suppressing desorption and attachment of water from and to the ceramic sprayed member.

Furthermore, since the ceramic sprayed member is heated, desorption of water physically adsorbed on the surface of the ceramic sprayed member can be promoted, which makes it possible to reliably suppress desorption and attachment of water from and to the ceramic sprayed member when the ceramic sprayed member is used.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
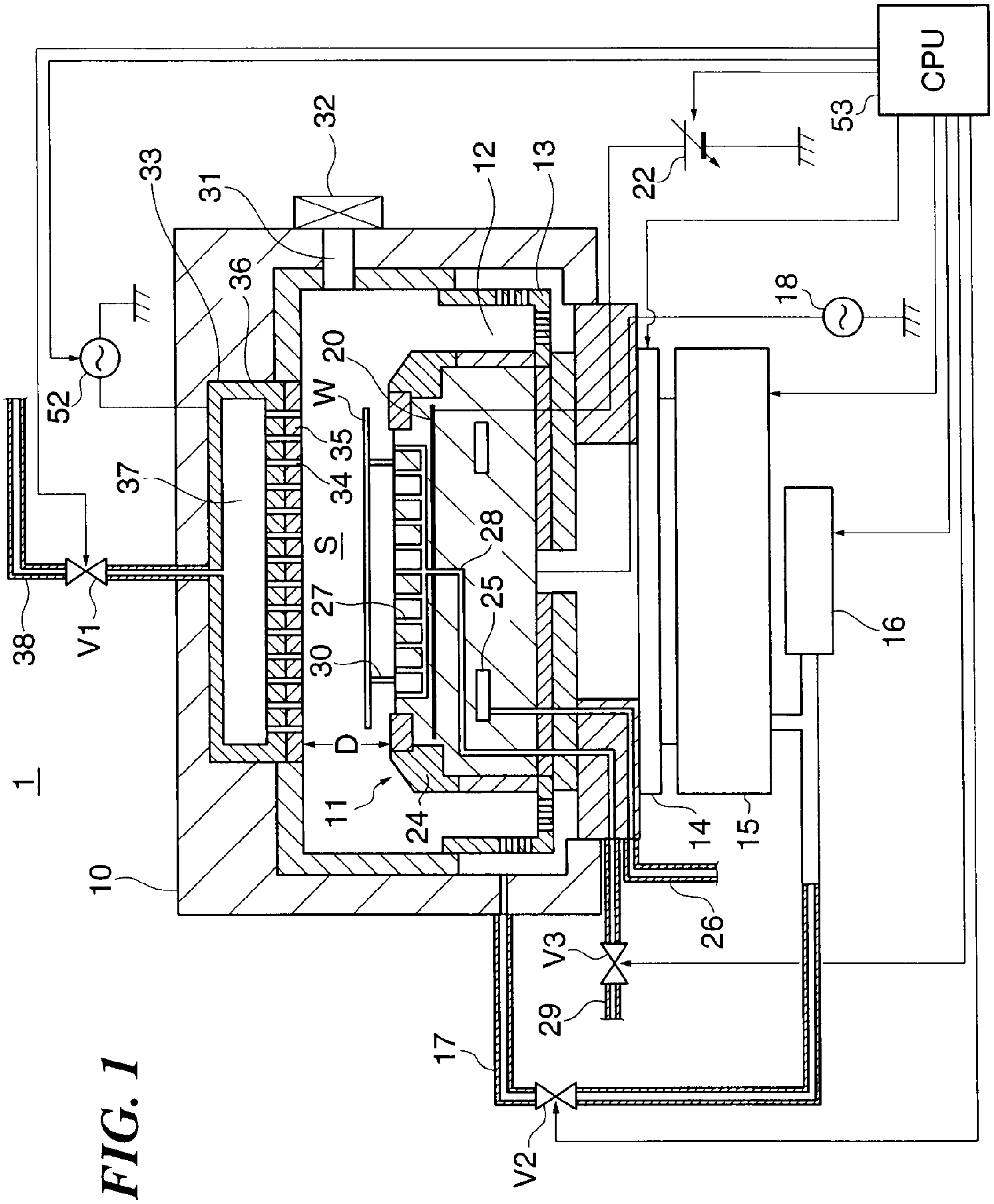
FIG. 1 is a cross-sectional view schematically showing the construction of a plasma processing apparatus in which a ceramic sprayed member according to an embodiment of the present invention is used.

FIG. 1 is a cross-sectional view schematically showing the construction of a plasma processing apparatus in which is used a ceramic sprayed member according to an embodiment of the present invention.

Referring to FIG. 1, the plasma processing apparatus 1 as an etching apparatus for carrying out etching on wafers has formed therein a cylindrical chamber (processing chamber) 10 formed of metal, e.g. aluminum or stainless steel. Disposed within the chamber 10 is a cylindrical susceptor 11 on which is placed a wafer W having a diameter e.g. of 300 mm.

Formed between an inner side wall of the chamber 10 and the susceptor 11 is an exhaust passage 12 functioning as a flow path for discharging a gas above the susceptor 11 out of the chamber 10. An annular baffle plate 13 is disposed in an intermediate portion of the exhaust passage 12. A portion of the exhaust passage 12 downstream of the baffle plate 13 is in communication with an automatic pressure control valve (hereinafter referred to as "the APC") 14 implemented by a variable butterfly valve. The APC 14 is connected to a turbo-molecular pump (hereinafter referred to as "the TMP") 15 as a vacuum pump for drawing a vacuum. Further, the APC 14 is connected to a dry pump (hereinafter referred to as "the DP") 16 as a vacuum pump via the TMP 15. An evacuation flow path formed by the APC 14, the TMP 15, and the DP 16 will be hereinafter referred to as "the main evacuation line". This main evacuation line not only controls pressure in the chamber 10 using the APC 14, but also decompresses the chamber 10 substantially to a vacuum using the TMP 15 and the DP 16.

Further, the portion of the exhaust passage 12 downstream of the baffle plate 13 is connected to another exhaust passage (hereinafter referred to as "the rough evacuation line"), which is provided in addition to the main evacuation line. The rough evacuation line is comprised of an evacuation pipe 17 with a diameter of e.g. 25 mm, for communication between the above-mentioned space and the DP 16, and a valve V2 provided in an intermediate portion of the evacuation pipe 17. The valve V2 is capable of blocking communication between the space and the DP 16. The rough evacuation line discharges gas from the chamber 10 using the DP 16.

Connected to the susceptor 11 is a high-frequency power supply 18 for supplying electric power of a predetermined high frequency to the susceptor 11. At an upper part inside the susceptor 11, a disk-shaped electrode plate 20 formed of a conductive film is disposed for attracting the wafer W by an electrostatic attractive force. A DC power supply 22 is electrically connected to the electrode plate 20. The wafer W is attracted and held on an upper surface of the susceptor 11 by a Coulomb's force or a Johnson-Rahbek force generated by a DC voltage applied to the electrode plate 20 from the DC power supply 22. When it is not required to attract the wafer W, the electrode plate 20 is electrically disconnected from the DC power supply 22, whereby the wafer W is placed in a floating state. Further, an annular focus ring 24 formed e.g. of silicon (Si) converges plasma generated above the susceptor 11 toward the wafer W.

Inside the susceptor 11 is formed an annular refrigerant chamber 25 extending along the circumference of the susceptor 11. A coolant, such as cooling water, at a predetermined temperature is supplied for circulation to the refrigerant chamber 25 from a chiller unit, not shown, through a pipe 26. The processing temperature of the semiconductor wafer W on the upper surface of the susceptor 11 is controlled through the temperature of the coolant.

A plurality of heat transfer gas supply holes 27 and heat transfer gas supply grooves (not shown) are disposed in a part (hereinafter referred to as the "holding surface") of the upper surface of the susceptor 11 where the semiconductor wafer W is held by attraction. The heat transfer gas supply holes 27 and the like are in communication with a heat transfer gas supply pipe 29 provided with a valve V3, via a heat transfer gas supply line 28 provided in the susceptor 11, so as to feed a heat transfer gas, such as He gas, supplied from a heat transfer gas supply section, not shown, connected to the heat transfer gas supply pipe 29 into a gap between the holding surface and a rear surface of the wafer W. Thus, heat-conductivity between the wafer W and the susceptor 11 is improved. The valve V3 is capable of blocking communication between the heat transfer gas supply holes 27 and the heat transfer gas supply section.

Further, a plurality of pusher pins 30 are disposed on the holding surface as lift pins that can protrude from the upper surface of the susceptor 11. The pusher pins 30 are moved up and down as viewed in FIG. 1 as rotational movement of a motor (not shown) is converted into linear movement by a ball screw or the like. When the semiconductor wafer W is held on the holding surface by attraction, the pusher pins 30 are withdrawn inside the susceptor 11. Then, when the wafer W is conveyed from the chamber 10 after completion of plasma processing including etching, the pusher pins 30 are moved to protrude from the upper surface of the susceptor 11 to separate the semiconductor wafer W from the susceptor 11 and lift the semiconductor wafer W upward.

A showerhead 33 is disposed in a ceiling portion of the chamber 10. A high-frequency power supply 52 is connected to the showerhead 33 and applies high-frequency power to the showerhead 33. Thus, the showerhead 33 functions as an upper electrode.

The showerhead 33 includes an electrode plate 35, which has a large number of gas vents 34, disposed on a lower surface thereof, and an electrode support 36 that detachably supports the electrode plate 35. A buffer chamber 37 is provided inside the electrode support 36, and processing gas supply piping 38 extending from a processing gas supply unit (not shown) is connected to the buffer chamber 37. A valve V1 is disposed midway across the gas supply piping 38. The valve V1 is capable of blocking communication between the buffer chamber 37 and the processing gas supply section. The inter-electrode distance D between the susceptor 11 and the showerhead 33 is set to not shorter than 27±1 mm, for example.

A gate valve 32 is mounted on a side wall of the chamber 10, for opening and closing an inlet/outlet port 31 for the wafer W. As mentioned above, inside the chamber 10 of the plasma processing apparatus 1, high-frequency electric power is supplied to the susceptor 11 and the showerhead 33 so that high-frequency electric power is applied inside the chamber 10 by the susceptor 11 and the showerhead 33, resulting in high-density plasma being produced from the processing gas in the space S between the susceptor 11 and the showerhead 33 and hence ions and radicals being produced.

Further, the plasma processing apparatus 1 has a CPU 53 provided inside or outside thereof. The CPU 53 is electrically connected to the valves V1, V2, V3, the APC 14, the TMP 15, the DP 16, the high-frequency power supplies 18 and 52, and the DC power supply 22 to control the operation of each of the component elements in response to user commands or predetermined process recipes.

With this plasma processing apparatus 1, during etching processing, first, the gate valve 32 is opened, and the wafer W to be processed is conveyed into the chamber 10, and mounted onto the susceptor 11. A processing gas (e.g., a mixed gas comprised of $C_4F_8$ gas, $O_2$ gas and Ar gas with a predetermined flow rate ratio therebetween) is introduced at a predetermined flow rate and the predetermined flow rate ratio from the showerhead 33 into the chamber 10, and the pressure inside the chamber 10 is set to a predetermined value using the APC 14 and the like. Next, high-frequency power is applied to the showerhead 33 from the high-frequency power supply 52, and high-frequency power is applied to the susceptor 11 from the high-frequency power supply 18. Further, a DC voltage is applied to the electrode plate 20 from the DC power supply 22, whereby the wafer W is attracted onto the susceptor 11. Then, the processing gas discharged from the showerhead 33 is turned into plasma as described above. Radicals and ions generated by this plasma are converged onto the surface of the wafer W by the focus ring 24 to thereby etch the surface of the wafer W physically or chemically.

As the processing gas for etching, in addition to the above-mentioned mixed gas, a gas containing any of compounds of halogen elements, such as fluoride, chloride, and bromide, are used, and hence a highly corrosive environment is produced inside the chamber 10. To prevent corrosion of the chamber component parts in the corrosive environment, a ceramic material, such as yttrium oxide ($Y_2O_3$) (hereinafter referred to as "yttria") or aluminum oxide ($Al_2O_3$), is thermally sprayed onto component parts including the focus ring 24, the showerhead 33, and the susceptor 11, and the inner wall of the chamber 10. In short, all the component parts used in the chamber 10 and the inner wall of the chamber 10 correspond to the ceramic sprayed member of the present invention.

Figure 2:
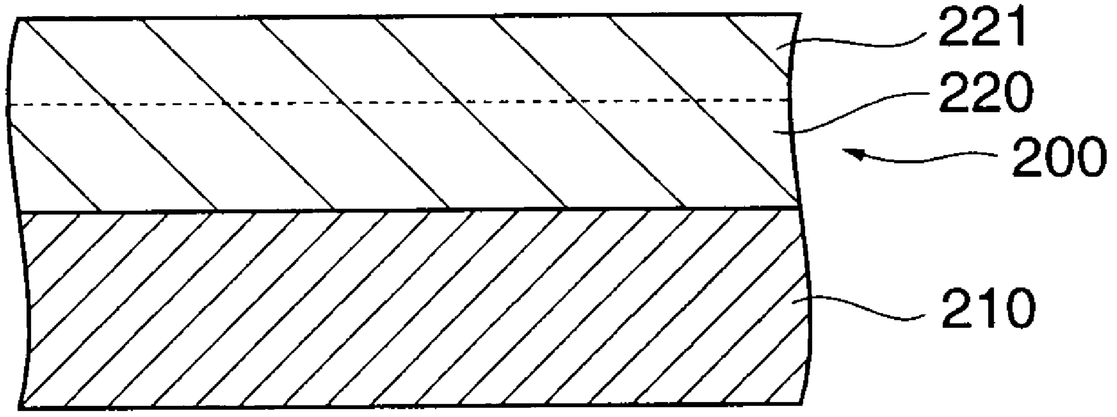
FIG. 2 is a cross-sectional view schematically showing the structure of the ceramic sprayed member according to the embodiment.

FIG. 2 is a cross-sectional view schematically showing the structure of the ceramic sprayed member according to the present embodiment.

Referring to FIG. 2, the ceramic sprayed member 200 is comprised of a base material 210, and a thermally sprayed film (surface layer) 220. The thermally sprayed film 220 includes a hydrated layer 221 having an outer surface thereof mainly composed of a hydroxide of ceramic. The thermally sprayed film 220 has a thickness of 10 to 500 μm, while the hydrated layer 221 has a thickness of approximately 100 μm, for example.

As the base material 210, any of steels including stainless steel (SUS), Al and an Al-based alloy, W and a W-based alloy, Ti and a Ti-base alloy, Mo and a Mo-based alloy, carbon, and an oxide-based or non-oxide-based ceramic sintered body, and a carbonaceous material is preferably used.

The thermally sprayed film 220 is composed of ceramics containing an element belonging to the third (IIIA) group of the periodic system (hereinafter simply referred to as "Group 3a element"). More specifically, the thermally sprayed film 220 is preferably composed of a rare-earth metal oxide including an oxide of a Group 3a element. Further, as the rare-earth metal oxide, yttria, $SC_2$, $O_3$, $Ce_2O_3$, and $Nd_2O_3$ are preferably used. In particular, yttria, which has conventionally been widely used, is preferable. The use of any of the above-mentioned materials makes it possible to suppress corrosion of the thermally sprayed film 220 due to the highly corrosive environment inside the chamber 10. The thermally sprayed film 220 can be formed not only by the thermal spraying method, but also by a thin film forming technology, such as the PVD method or the CVD method.

The hydrated layer 221 is formed on the outer surface of the thermally sprayed film 220 e.g. by hydration reaction through reaction of the thermally sprayed film 220 with vapor or high-temperature water around the thermally sprayed film 220. When yttria is selected from the above-mentioned ceramics as the material of the thermally sprayed film 220, a reaction expressed by the following formula (1) occurs:

$$Y_2O_3+H_2O \rightarrow Y_2O_3\cdot(H_2O)n \rightarrow 2(YOOH) \rightarrow Y(OH)_3 \quad (1)$$

In the formula (1), the valences are not considered.

As shown in the formula (1), a hydroxide of yttria is finally formed by hydration processing. In the case of the other Group 3a elements, hydroxides are formed through similar reactions. As hydroxides, $Y(OH)_3$, $Sc(OH)_3$, $Ce(OH)_3$, and $Nd(OH)_3$ are preferable.

Hydroxides of Group 3a elements are very stable, and show a property (hydrophobicity) of suppressing desorption of chemically adsorbed water and adsorption of water from the outside. Therefore, by forming the hydrated layer 221 mainly composed of one of the above-mentioned hydroxides on the outer surface of the thermally sprayed film 220, it is possible to suppress desorption of water from the ceramic sprayed member 200 and attachment of external water to the ceramic sprayed member 200.

The ceramic sprayed member constructed as described above is cleaned by a method described hereinbelow. This cleaning process is carried out, for example, when the ceramic sprayed member is removed from the chamber 10 for maintenance when a predetermined time period has elapsed after the plasma processing apparatus 1 started etching.

Figure 3:
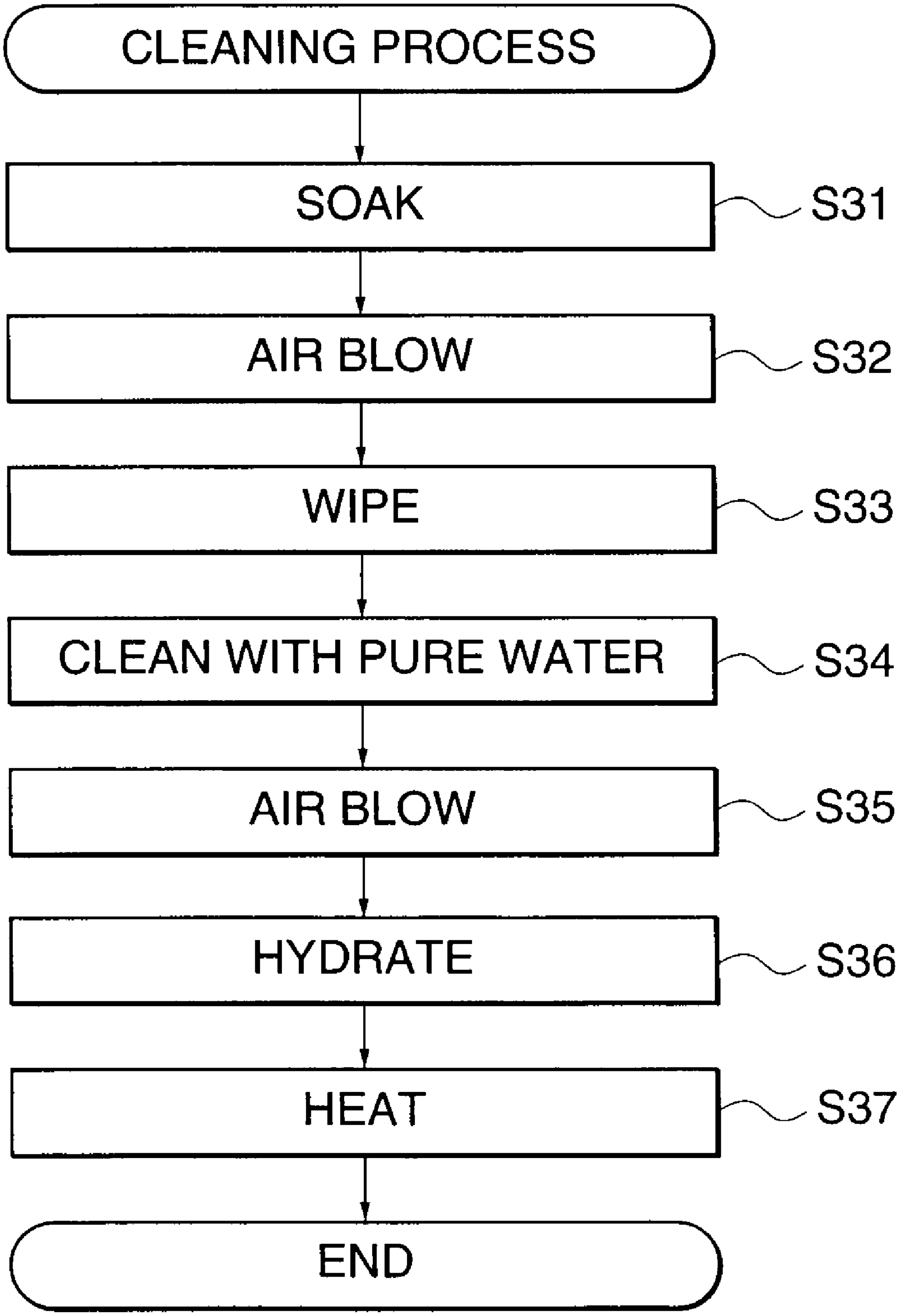
FIG. 3 is a flowchart which is useful in explaining a ceramic sprayed member-cleaning method according to the embodiment.

FIG. 3 is a flowchart which is useful in explaining a ceramic sprayed member-cleaning method according to the present embodiment. In the following, a description will be given of the method of cleaning the ceramic sprayed member having a thermally sprayed film of yttria formed thereon.

As shown in FIG. 3, first, the ceramic sprayed member 200 is soaked in an acetone-based or fluorine-based solvent at room temperature (step S31). At this time, the whole member 200 is soaked in the solvent. As a consequence, deposits attached to the ceramic sprayed member 200 are removed. Thus, the deposits as a cause of generation of particles can be reliably removed. The soak time period is set to an optimal value within a range of 1 hour to 12 hours according to the amount and degree of attachment of deposits to the ceramic sprayed member 200. Further, as the fluorine-based solvent, HFE7100, HFE711PA (manufactured by SUMITOMO 3M Ltd.), GALDEN HT70 (manufactured by AUSIMONT S.p.A.), etc. are preferably used. After the ceramic sprayed member 200 is taken out, deposits floating in the solvent are all removed so as to prevent the floating deposits from being attached to another ceramic sprayed member 200 when it is soaked.

Then, the whole ceramic sprayed member 200 is air-blown using an air gun (step S32) to remove deposits attached to the ceramic sprayed member 200. Air for use in the air blow has a pressure of 0.2 to 0.5 MPa, and is blown from a nozzle of the air gun positioned 10 cm or more away from the ceramic sprayed member 200. This air blow is continued until visually recognizable removable deposits disappear. The gas for use in the air blow may be a nitrogen gas.

When deposits still remain on the ceramic sprayed member 200 even after execution of the air blow, a $CO_2$ blast with a pressure of not higher than 0.4 MPa and a dry ice particle size of $\phi$0.3 to 0.6 mm, or a bubble jet (registered trademark) with an air pressure of not higher than 0.2 MPa and a water pressure of not higher than 7.0 MPa is applied to the ceramic sprayed member 200. The $CO_2$ blast or the bubble jet is applied to the ceramic sprayed member 200 from a nozzle positioned 15 cm or more away from the ceramic sprayed member 200 while constantly moving the nozzle so as to prevent concentration of the $CO_2$ blast or the bubble jet on one point of the ceramic sprayed member 200. This makes it possible to remove deposits attached to the surface of the ceramic sprayed member 200, thereby suppressing generation of particles caused by chemical reaction with the deposits.

Next, the whole ceramic sprayed member 200 is wiped using a wiper impregnated with a small amount of alcohol not lower than 99% in purity, such as ethanol or isopropyl alcohol, with the wiper covering the ceramic sprayed member 200 (step S33). This wiping is continued until the wiper ceases to be stained. Thus, organic substances and the like attached to the surface of the ceramic sprayed member 200 are removed.

Then, the ceramic sprayed member 200 is subjected to cleaning for approximately 10 minutes using ultrasonic waves by applying ultrasonic waves having a frequency not lower than 20 kHZ and whose output range is from 1000 to 2400 W to pure water in a bath, while the ceramic sprayed member 200 is soaked in the pure water (step S34). It is preferred that the pure water for use in cleaning has a volume resistivity of 15 MΩ or more. Thereafter, the ceramic sprayed member 200 is taken out from the bath and uniformly washed using pure water similar to the above-mentioned pure water.

Further, the whole ceramic sprayed member 200 is air-blown using the air gun (step S35), to remove water attached to the ceramic sprayed member 200. The air for use in the air blow has a pressure of 0.2 to 0.5 MPa, and is blown from the nozzle of the air gun positioned not shorter than 10 cm away from the ceramic sprayed member 200. This air blow is continued until the water is fully removed. If water still remains on the ceramic sprayed member 200, the thermally sprayed film 220 looks gray, and hence the air blow is preferably continued until the thermally sprayed film 220 has apparently lost the gray color. The gas used for the air blow may be a nitrogen gas.

Figure 4:
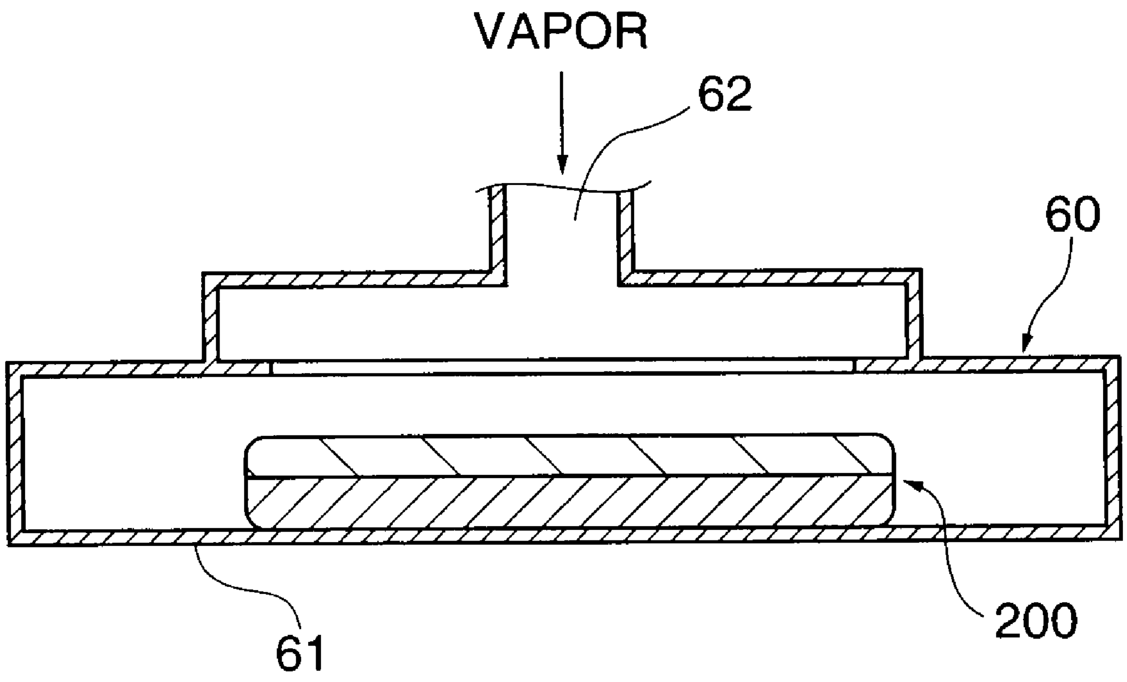
FIG. 4 is a cross-sectional view schematically showing a pressurized heating furnace for use in hydration processing executed in a step S36 in FIG. 3.

Next, a pressurized heating furnace 60 comprised of a heater 61 for heating an internal space in the furnace 60 and the ceramic sprayed member 200 placed in the internal space, and a vapor-introducing port 62 for introducing vapor into the internal space of the furnace 60, as shown in FIG. 4, is prepared. The ceramic sprayed member 200 is placed into the pressurized heating furnace 60 and heated, for example, for 1 to 24 hours in a temperature range of 100 to 300° C. under an environment of a pressure not lower than 202.65 kPa (2.0 atm) and a relative humidity not lower than 90%. That is, the ceramic sprayed member 200 is exposed to a high-pressure, high-humidity, and high-temperature environment, whereby the outer surface of the thermally sprayed film 220 is hydrated (stabilizing step) (step S36). As a consequence, the hydrated layer 221 is formed on the outer surface of the thermally sprayed film 220. In the hydrated layer 221, yttria which has undergone hydration reaction to be chemically bonded to water and stabilized, and hence it is possible to suppress desorption of water from the ceramic sprayed member 200 and attachment of external water to the same in the vicinity of the temperature of the chamber during execution of the cleaning process.

The hydrated layer 221 is already formed on the surface of the ceramic sprayed member 200 before it is used in the plasma processing apparatus 1. However, the hydrated layer 221 deteriorates during the etching process, and therefore the hydrated layer 221 is formed again during the cleaning process.

When the relative humidity or the heating temperature is low, the time period for heating the base material 210 has only to be prolonged. To efficiently carry out the hydration processing, it is required to perform the hydration processing under a high-temperature and high-pressure environment. Basically, however, the hydration reaction on the yttria surface can be progressed to a sufficient degree even at room temperature, for example, by carrying out the hydration processing over a long time period, and therefore the above-mentioned conditions for carrying out hydration processing on the outer surface of the thermally sprayed film 220 are not limitative.

Then, the ceramic sprayed member 200 with the hydrated layer 221 formed thereon is heated for approximately two hours or more at a temperature of at least 70° C., preferably approximately 100° C., in a drying furnace under a pressure of 101.3 kPa (1.0 atm) (desorbing step) (step S37) so as to remove, by drying, water attached to the hydrated layer 221 or the thermally sprayed film 220. Thus, water trapped in fine pores in the surface of the hydrated layer 221, i.e. water physically adsorbed on the hydrated layer 221 is desorbed. Further, the drying furnace is purged with a gas highly reactive with water, and the present process is terminated.

Next, a description will be given of the adsorption characteristic of water molecules on the ceramic sprayed member 200 subjected to the cleaning process in FIG. 3.

First, a ceramic sprayed member 200 subjected to the cleaning process in FIG. 3 was exposed to the atmosphere for a long time period and was placed into the chamber 10, and then evacuation of the chamber 10 was carried out for approximately two hours. Then, the amount of water molecules (hereinafter referred to as "water content") contained in exhaust air drawn from the chamber 10 was measured. Also, a ceramic sprayed member 200 subjected to the cleaning process in FIG. 3 was exposed to a high-humidity environment (with relative humidity not lower than 90%) where a humidifier is provided, for a predetermined time period. Then, the ceramic sprayed member 200 was placed into the chamber 10, and then evacuation of the chamber 10 was carried for approximately two hours. Then, the water content of exhaust air drawn from the chamber 10 was measured.

Another ceramic sprayed member 200 subjected to only a cleaning process using an organic solvent or acid was exposed to the atmosphere over a long time period and was placed into the chamber 10, then evacuation of the chamber 10 was carried out for approximately two hours, and the water content of exhaust air drawn from the chamber 10 was measured. Still another ceramic sprayed member 200 subjected to only the cleaning process using the organic solvent or acid was exposed to the above-mentioned high-humidity environment where the humidifier is provided, for a predetermined time period, and was placed into the chamber 10, then evacuation of the chamber 10 was carried out for approximately two hours at a room temperature e.g. of 20° C., and the water content of exhaust air drawn from the chamber 10 was measured. The results of these measurements are shown in FIG. 5.

Figure 5:
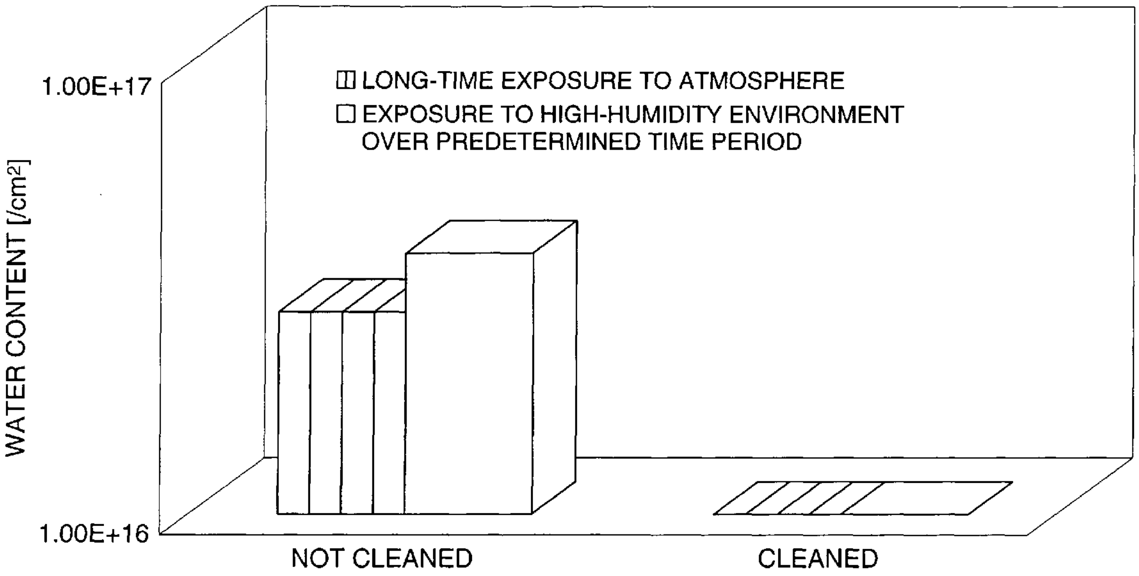
FIG. 5 is a diagram showing the amount of water released from the ceramic sprayed member.

FIG. 5 is a diagram showing the amount of water released from the ceramic sprayed member. A value "1.00E+16" on the ordinate in FIG. 5 indicates the water content (/$cm^2$) of exhaust air drawn from the chamber 10 with no member placed therein (hereinafter referred to as "the reference water content").

As shown in FIG. 5, in the case where a ceramic sprayed member is exposed to the atmosphere over a long time period, the water content of exhaust air measured after execution of the cleaning process in FIG. 3 is considerably smaller than that measured when the cleaning process was not carried out, and assumes a value substantially equal to the reference water content. Therefore, after exposure to the atmosphere, the amount of water molecules desorbed from the ceramic sprayed member 200 subjected to the cleaning process in FIG. 3 is substantially equal to 0. Similarly, in the case where a ceramic sprayed member is exposed to the high-humidity environment for a predetermined time period, the water content of exhaust air measured after execution of the cleaning process in FIG. 3 is considerably smaller than that measured when the cleaning process was not carried out, and assumes a value substantially equal to the reference water content. Therefore, after exposure to the high-humidity environment, the amount of water molecules desorbed from the ceramic sprayed member 200 subjected to the cleaning process in FIG. 3 is substantially equal to 0. These results show that adsorption of water molecules on the ceramic sprayed member 200 in the atmosphere or under a high-humidity environment can be suppressed by carrying out the cleaning process in FIG. 3 on the ceramic sprayed member 200.

As described above, according to the present embodiment, the outer surface of the thermally sprayed film 220 is hydrated to thereby stabilize water chemically adsorbed on the surface of the ceramic sprayed member 200 (step S36), and water physically adsorbed on the hydrated layer 221 of the ceramic sprayed member 200 is desorbed (step S37). As a result, when the ceramic sprayed member 200 is used, it is possible to reliably suppress desorption and attachment of water from and to the ceramic sprayed member 200.

Further, according to the present embodiment, since hydration processing is carried out under the environment of the pressure not lower than 202.65 kPa (2.0 atm), the relative humidity not lower than 90%, and the temperature range of 100 to 300° C., it is possible to achieve more stable bonding of water chemically adsorbed on the surface of the ceramic sprayed member 200 to the same surface.

Furthermore, according to the present embodiment, since the ceramic sprayed member 200 is heated, desorption of water physically adsorbed on the surface of the ceramic sprayed member 200 can be accelerated, which makes it possible to further reliably suppress desorption and attachment of water from and to the ceramic sprayed member 200.

Although in the present embodiment, the hydrated layer 221 is formed by hydration processing, this is not limitative, but any other suitable method may be employed insofar as it can eventually form a layer mainly composed of a hydroxide of ceramic.

Although in the present embodiment, the ceramic sprayed member 200 with the hydrated layer 221 formed thereon is heated for approximately not shorter than two hours at a temperature of approximately 100° C., in a drying furnace under a pressure of 101.3 kPa, this is not limitative, but when the drying furnace is decompressed, the ceramic sprayed member 200 can be heated even at a temperature not higher than 100° C. Further, even when the temperature of the drying furnace is not sufficiently high under the environment of a pressure of 101.3 kPa, it is possible to fully dry the ceramic sprayed member 200 by holding the same in the drying furnace for a long time period, whereby water attached to the hydrated layer 221 can be desorbed.

Further, in the present embodiment, water containing ions, e.g. ionized water with a pH higher than 7 may be used for hydration processing so as to enhance the effect of the hydration processing in the step S36. This makes it possible to improve the hydrophobicity of the hydrated layer 221.

In the present embodiment, a gas highly reactive with water may be introduced into the drying furnace so as to enhance the effect of the heating processing in the step S37. For example, a methylsilane compound, such as trimethylchlorosilane, dimethyldichlorosilane, monomethyltrichlorosilane, or tetrachlorosilane, or a water-reactive oxygen/halogen compound, such as dichloropropane, dibromopropane, nitrosyl chloride, carbonyl chloride (phosgene), carbonyl fluoride, diborane, chlorine, fluorine, thionyl bromide, iodomethyl propane, acetyl chloride, acetone dimethyl acetal, carbon monoxide, hydrogen chloride, or trichloroboron may be introduced. Alternatively, any other gas essentially having high reactivity with water may be introduced into the drying furnace.

Although in the present embodiment, the ceramic sprayed member 200 is hydrated using the pressurized heating furnace 60, this is not limitative, but a general HIP (Hot-Isostatic-Pressing) furnace may be used, for example, or alternatively, any suitable apparatus may be employed insofar as it is configured to provide a high-temperature and high-pressure environment for hydrating the ceramic sprayed member 200.

Although in the present embodiment, the hydration processing in the step S36 is carried out by exposing the ceramic sprayed member 200 to the high-pressure, high-humidity, and high-temperature environment, this is not limitative, but the hydration processing may be carried out by soaking the ceramic sprayed member 200 in water.

Although in the present embodiment, ceramic sprayed members removed for maintenance which is carried out when a predetermined time period has elapsed after the start of etching by the plasma processing apparatus 1 are cleaned, this is not limitative, but the ceramic sprayed members may be cleaned before they are used in the plasma processing apparatus 1.

Further, the ceramic sprayed member cleaned by the cleaning method according to the present embodiment is subjected to hydration processing and hence has the hydrated layer 221 containing a hydroxide of ceramic. Therefore, as a method of determining whether or not a chamber component part has been subjected to the cleaning method according to the present embodiment, a method of detecting a hydroxyl group on the surface of the component part using High resolution electron energy loss spectroscopy is preferable. Further, since the ceramic sprayed member cleaned by the cleaning method according to the present embodiment has the hydrated layer 221 containing a hydroxide of ceramic, when the bond state of the surface layer of the ceramic sprayed member is analyzed using High resolution electron energy loss spectroscopy, no O—H bond in the $H_2O$ structure can be detected from the surface layer. Therefore, when no O—H bond in the $H_2O$ structure can be detected from the surface layer as a result of the analysis, it can be determined that the component part within the chamber has been subjected to the cleaning method according to the present embodiment.

Further, since the hydrated layer 221 has hydrophobicity, whether or not a chamber component part has been subjected to the cleaning method according to the present embodiment can be determined by coating the surface of the hydrated layer 221 of the component part with a predetermined resin and then cutting the component part to analyze the degree of resin impregnation in the component part, e.g. the degree of whitening of the cross section of the component part, for example. More specifically, if the cross section is whitened, it can be determined that the component part has not been subjected to the cleaning method according to the present embodiment, whereas if the cross section is not whitened, it can be determined that the component part has been subjected to the cleaning method. This is because when the component part has been subjected to the present cleaning method, the hydrophobicity of the hydrated layer 221 prevents permeation of the resin from into the component part.

Although in the present embodiment, the ceramic sprayed member 200 is used in the chamber 10 of the plasma processing apparatus 1, this is not limitative, but the ceramic sprayed member 200 may be used in a processing apparatus other than the plasma processing apparatus, a load-lock chamber for conveying substrates or the like to a processing apparatus, or a conveyor, such as an atmospheric conveying module.

Although in the present embodiment, an object to be processed by the plasma processing apparatus 1 is a wafer W, this is not limitative, but the object may be a glass substrate e.g. for an FPD (Flat Panel Display) including an LCD (Liquid Crystal Display).

Further, insofar as the ceramic sprayed member-cleaning method according to the present embodiment is concerned, in a ceramic sprayed member-cleaning system comprised of e.g. a member-soaking device, a blowing device for blowing a gas onto a member, a wiping device for wiping the member, a pressurized heating furnace, and a drying furnace, the cleaning method may be executed by a controller implemented e.g. by a computer provided in the cleaning system, for controlling the operations of the component elements of the cleaning system.

Further, it is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A method of cleaning a ceramic sprayed member having a predetermined ceramic material thermally sprayed on a surface thereof, comprising:

a stabilizing step of chemically bonding the surface of the ceramic sprayed member and water to each other to stabilize the water; and a desorbing step of desorbing water physically adsorbed on the surface of the ceramic sprayed member, wherein said stabilizing step includes carrying out hydration processing in which the ceramic sprayed member is exposed to a temperature range of 100° C. to 300° C., a pressure not lower than 202.65 kPa, and a relative humidity not lower than 90%, and wherein in said desorbing step, a gas highly reactive with water is introduced into a space surrounding the ceramic sprayed member, and the introduced gas is selected from the group consisting of a methylsilane compound being trimethylchlorosilane, dimethyldichlorosilane, monomethyltrichlorosilane, or tetrachlorosilane, and a water-reactive oxygen/halogen compound being dichloropropane, dibromopropane, nitrosyl chloride, carbonyl chloride (phosgene), carbonyl fluoride, diborane, chlorine, fluorine, thionyl bromide, iodomethyl propane, acetyl chloride, acetone dimethyl acetal, carbon monoxide, hydrogen chloride, or trichloroboron.

2. A method as claimed in claim 1, wherein said stabilizing step comprises forming a layer mainly composed of a hydroxide of ceramic on the surface of the ceramic sprayed member.

3. A method as claimed in claim 1, wherein said desorbing step comprises heating the ceramic sprayed member.

4. A method as claimed in claim 1, further comprising a removing step of removing deposits attached to the ceramic sprayed member, before execution of said stabilizing step.

5. A method as claimed in claim 4, wherein said removing step comprises at least soaking of the ceramic sprayed member in an organic solvent or acid.

6. A method as claimed in claim 1, wherein the ceramic material comprises a rare earth metal oxide.

7. A method as claimed in claim 6, wherein the rare earth metal oxide comprises yttria.

* * * * *